United States Patent Office.

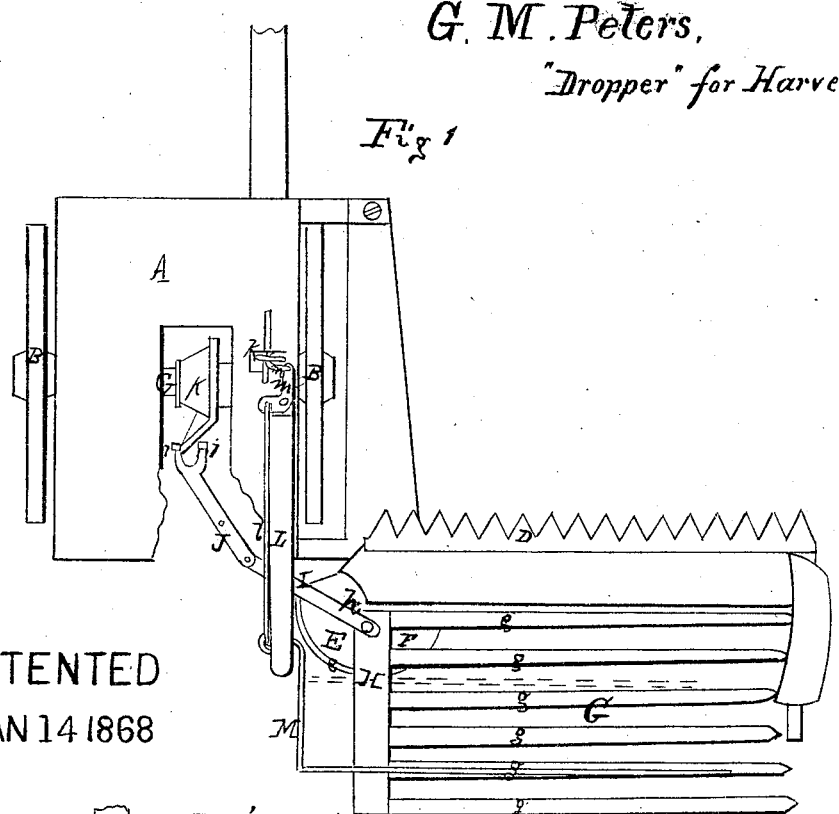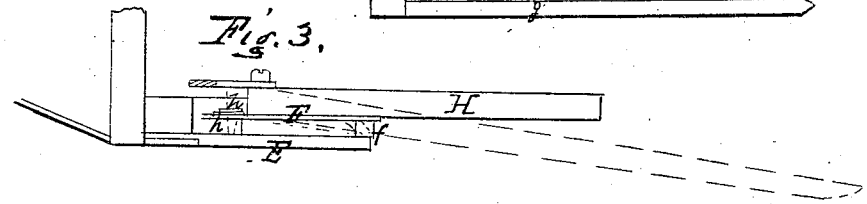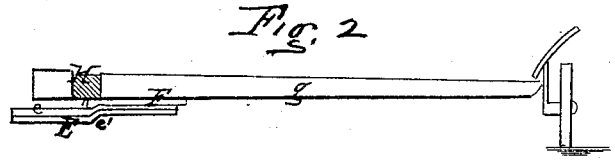

G. M. PETERS, OF LANCASTER, OHIO.

Letters Patent No. 73,380, dated January 14, 1868.

---

IMPROVEMENT IN DROPPING-PLATFORMS FOR HARVESTERS.

---

The Schedule referred to in these Letters Patent and making part of the same.

---

TO ALL WHOM IT MAY CONCERN:

Be it known that I, G. M. PETERS, of Lancaster, Fairfield county, and State of Ohio, have invented a new and useful Improvement in Droppers for Harvesters; and I do hereby declare the following to be a full, clear, and exact description of the same. reference being had to the accompanying drawings, making a part of this specification, in which—

Figure 1 is a plan or top view of a reaping-machine having my improved dropper attached.

Figures 2 and 4 are rear elevations of the dropper and of the fixed and vibrating plates or ways, by means of which the dropper is operated to discharge the gavel, and Figure 3 is a frame side elevation of the same.

Similar letters of reference denote corresponding parts in all the figures.

Slatted dropping-platforms, as heretofore constructed and operated, have been principally of two kinds or classes, one having the slats arranged in position parallel with the finger-bar to receive the grain, and operated for discharging the gavel by being swung or turned around to a position at an angle nearly or quite ninety degrees to said finger-bar when the platform was tilted sidewise upon an axis parallel with the slats, and in line with or nearly with the path of the machine. By this arrangement the grain was received crosswise of the slats, upon the platform, directly in rear of the cutting-apparatus, and was discharged heads foremost upon the ground behind the main frame, out of the path of the machine on its next round.

In the second arrangement the slats of the platform were arranged at right angles, or thereabouts, to the finger-bar, and in line with the path of the machine, and were connected, at their forward ends, to a bar lying parallel with and hinged to the finger-bar. In this form the rear ends of the slats were merely raised while the platform was receiving the grain, and were dropped upon the ground when it was desired to discharge the same, and, the slats being made light and thin, the stubble projected between the slats sufficiently far to seize the grain and hold it as the machine was advanced, causing the platform to be withdrawn from underneath the same, thereby depositing the gavel directly behind the cutting-apparatus, and in the way of the machine on its next round.

The object of my invention is to combine the advantages of both of these classes, and to obviate their defects; in other words, to discharge the grain in gavels out of the way of the machine on the next round, thereby avoiding the necessity for binding the grain as it is cut, and at the same time to drop the platform or slats upon the ground in the proper position to cause the stubble to assist in the discharge of the gavel therefrom; and to this end, My invention consists in the employment of a dropper-platform, composed of slats parallel with the cutting-apparatus, and supported at their inner end only, arranged to turn horizontally upon a pivot at or near its inner end, and to tilt or drop upon an axis at right angles to the slats and to the path of the machine. It further consists in the construction and arrangement of means or devices for operating the said platform, and the cut-off used in connection therewith, as hereinafter set forth.

To enable others to understand and use my invention, I will proceed to describe the same with reference to the drawings, in which—

A represents the main frame of a harvesting-machine; B B, the driving and carrying-wheels; C, the main drive-wheel axle; D, the cutting-apparatus, constructed and combined in any usual or desired manner, the construction shown being what is termed a rear-cut hinged-bar machine, of the class familiarly known as "the Ball machine." To the inner end of the platform or heel of the shoe or drag-bar, I attach a horizontal semicircular plate or way, E, having the raised bead or rib $e$, and provided with an offset or incline, $e'$, arranged, relatively to the plate and finger-bar, in such manner that the lower portion of the plate shall be the inner or main frame side, as represented in fig. 2. F is a quadrant-shaped plate, resting upon plate E, and firmly attached to the platform G in such manner as to move therewith, and provided with a pendent pin or lip, $f$, at its rear inner corner, for a purpose hereinafter explained. The platform is composed of a series of parallel slats, $g$, of any desired number, and arranged at a suitable distance apart, in a position parallel with the finger-bar or cutting-apparatus D, and attached firmly at their inner ends to the bar H, to which bar also the plate F is attached in any suitable manner. The plates E and F are pivoted together by means of a vertical pivot, $h$, arranged at the inner front corner of the platform, and centrally of the semicircular and quadrant plates E and F. $h'$ is a hub or washer, on pivot $h$, interposed between the plates, and made of a thickness corresponding to the thickness of bead or rib $e$ on plate E. The perforation in plate F, which is arranged to turn on the pivot $h$, is somewhat larger than is necessary to the reception of said pivot, so as to allow a vertical play or movement to adapt it to the rising and falling of the platform, as hereinafter described. $i$ is a pin or lug, attached to platform H or plate F, at a point in rear of pivot $h$, to which one end of a pitman, I, is attached, the opposite inner end of pitman being connected to the rear end of the pivoted lever J. The lever J is supported in a hanging frame of the machine, and its forward end is forked, and the forked arms are provided with friction-rollers $j\,j$, which embrace a wave or cam-wheel, K, the rotation of which imparts a vibrating movement to the lever J, and thence through pitman I to the slatted dropper. The cam-wheel K is shown, in this instance, as mounted upon the drive-wheel axle, and is caused to rotate therewith by means of a sliding clutch, arranged upon and rotating with said axle. The clutch is thrown into and out of gear with the wave-wheel by means of an upright lever, $k$, pivoted on the main frame, within convenient reach of the driver, on his seat on the machine. L is an inclined arm or standard, mounted on the frame, and extending backward far enough to afford a support for an angular rod, M, mounted in bearings therein, and adapted to serve as a cut-off to receive and support the falling grain while the platform is being operated to discharge the completed gavel. $m$ is a bell-crank lever, mounted on standards L, or other convenient points of support. One arm of said lever is connected by means of link $m'$ to the upright lever $k$, and the other arm is connected by a link or rod, $l$, to a crank-arm on rod M, in such manner as to operate the same, and interpose it to receive the falling grain at the same time that the clutch is thrown into gear with the cam-wheel to operate the platform.

The operation will be readily understood from the foregoing description. Whenever a sufficient quantity of grain has accumulated to form a sheaf, the driver, by operating lever $k$, slides the clutch into gear with the cam-wheel, and, at the same instant, throws the cut-off down into the position shown in dotted lines, fig. 1, to receive the falling grain and prevent further accumulation thereon, when, by the rotation of the cam-wheel, the forked lever is vibrated, and the platform is swung around into a position at right angles to the cutting-apparatus, when the quadrant, having passed the incline in semicircular plate E, the outer or rear ends of the slats are allowed to drop upon the ground, turning upon pin or stud $f$ and pivot $h$, and the stubble, penetrating between the slats, seizes and holds the grain thereon until they are drawn from underneath by the forward motion of the machine, when, by the continued rotation of the cam-wheel, the slats are again elevated and swung back into position to receive the grain. The driver now releases lever $k$, and the cut-off is thrown up, and the grain accumulated thereon is dropped upon the platform.

It is intended to have the lever that shifts the clutch caught and held by a spring, when the clutch is thrown into gear, until the cam has made one revolution, thereby operating the platform to discharge the grain thereon, and to return it to its proper position to again receive the falling grain, when, by means of a pin fastened in the cam, the spring may be thrown off, allowing the clutch to escape. By this arrangement the necessity for the constant watching of the movement of the platform by the driver, to enable him to stop it at the right moment, is obviated.

The platform may be operated by other devices than those shown and described, but these are sufficient to show the nature and object of my invention.

Having now described my improvements in harvester-droppers, what I claim, and desire to secure by Letters Patent, is—

1. A slatted dropping-platform adapted to turn upon a pivot located at its inner front corner, and to tilt or drop upon a hinge or fulcrum-supports, arranged in a line parallel with the finger-bar, substantially as described.

2. The semicircular plate E, provided with the incline or offset $e'$, in combination with the quadrant-plate, or its equivalent, attached to the platform, and operating substantially as described.

3. The slatted platform, pivoted at its inner front corner, in combination with the plates E and F, or their equivalents, substantially as described.

4. The dropping-platform, pivoted at its inner front corner, in combination with the forked lever J and cam-wheel K, substantially as described.

5. The combination of the turning and dropping-platform with the cut-off M, in the manner substantially as described, whereby the cut-off is operated by the same lever which throws into gear the mechanism operating the platform, as set forth.

G. M. PETERS.

Witnesses:
    JOHN C. TAIT,
    O. E. PETERS.